United States Patent

Gibson

[15] 3,699,321

[45] Oct. 17, 1972

[54] AUTOMATIC ADAPTIVE EQUALIZER IMPLEMENTATION AMENABLE TO MOS

[72] Inventor: Earl D. Gibson, Huntington Beach, Calif.

[73] Assignee: North American Rockwell Corporation

[22] Filed: April 1, 1971

[21] Appl. No.: 130,129

[52] U.S. Cl. ....................235/152, 333/18, 328/162, 325/42, 325/65

[51] Int. Cl. ............................H04b 3/04, H04b 1/62

[58] Field of Search..325/42, 65; 178/69 B; 235/152; 333/18; 328/162

[56] References Cited

UNITED STATES PATENTS 3,614,622 10/1971 Holsinger ....................325/42

3,614,623 10/1971 McAuliffe ....................325/42

3,524,169 8/1970 McAuliffe et al........333/18 X

*Primary Examiner*—Joseph F. Ruggiero
*Assistant Examiner*—James F. Gottman
*Attorney*—L. Lee Humphries, H. Fredrick Hamann and Edward Dugas

[57] ABSTRACT

The present invention is an adaptive equalizer which utilizes a first shift register to store received signal samples and a second shift register to store gain settings. The serial output from the first shift register is parallel multiplied with the gain settings stored in the second register to achieve equalization of a received digital data transmission signal. The gain settings in the second register are updated to automatically equalize by utilizing an incremental control signal which is derived from the system's input signal and the received digital data, using cross-correlation implemented iteratively.

11 Claims, 3 Drawing Figures

INVENTOR
EARL D. GIBSON
BY Edward Dugas
ATTORNEY

INVENTOR
EARL D. GIBSON
BY Edward Dugas
ATTORNEY

INVENTOR
EARL D. GIBSON
BY Edward Dugas
ATTORNEY

AUTOMATIC ADAPTIVE EQUALIZER IMPLEMENTATION AMENABLE TO MOS

BACKGROUND OF THE INVENTION

Adaptive equalizers have in the past been constructed with a multi-tap delay line and a plurality of amplitude adjusting means connected to a different one of the multi-taps for adjusting the amplitude of the signals appearing at each of the taps. A summing means is then used to add the outputs of the plurality of adjusting means to provide a composite signal. The composite signal is then compared against a known or calculated level to decode the bits of information that were actually sent. Also, the composite signal is used to provide a control signal for adjusting the amplitude of the adjusting means.

Applicant's device is a unique departure from the well known adaptive equalizer in that he provides a system that converges to amplitude settings that result in better overall receiver performance while providing convergence over a several-fold wider range of conditions. The present inventive system also is adaptible to various types of signaling and provides fast initial learning together with accurate subsequent tracking of channel characteristics.

SUMMARY OF THE INVENTION

The present invention is directed to an improved adaptive equalizer which utilizes a first recirculating shift register for receiving a sampled digital data signal and a first multiplier for serially receiving the output of the first shift register. An accumulator means is used to receive the output of the multiplier. A signal proportional to the major sample of the impulse response of the overall transmission system, along with a signal proportional to the estimated value of the received digit, is fed to a product forming means which means provides an output signal proportional to the product of the two received signals. A first comparator then is utilized to provide an output signal which is proportional to the sign difference between the provided product signal and the accumulator output signal. The proportional sign difference signal is then compared in a second comparator against a signal having a sign proportional to the most recently received sampled digital data signal to provide an increment signal having a sign which is determined by the compared signals. A second recirculating shift register is used to store gain factors corresponding to the multiplier for each stage of the first shift register. The output signals from the second shift register are parallel multiplied in the first multiplier against the signals from the first shift register by the first multiplier with the stored gain factors being incrementally adjusted by the signal from the second comparator. This simple incremental adjustment technique actually implements iteratively a sophisticated cross-correlation function for each equalizer gain factor, thereby providing major advantages in convergence capabilities and performance under noise.

Accordingly, it is an object of the present invention to provide an improved adaptive equalizer.

It is a further object of the present invention to provide an equalizer that converges under a several-fold wider range of conditions than previous automatic adjustment algorithms.

It is an additional object of the present invention to provide an equalizer which converges to settings that result in much better overall receiver performance than previous algorithms.

It is a further object of the present invention to provide an equalizer which is adaptable to various types of signaling.

These and other objects of the present invention will become more apparent and better understood when taken in conjunction with the following description and drawings, throughout which like characters indicate like parts, and which drawings form a part of this application.

DESCRIPTION OF THE PREFERRED EMBODIMENT

Figure 1:
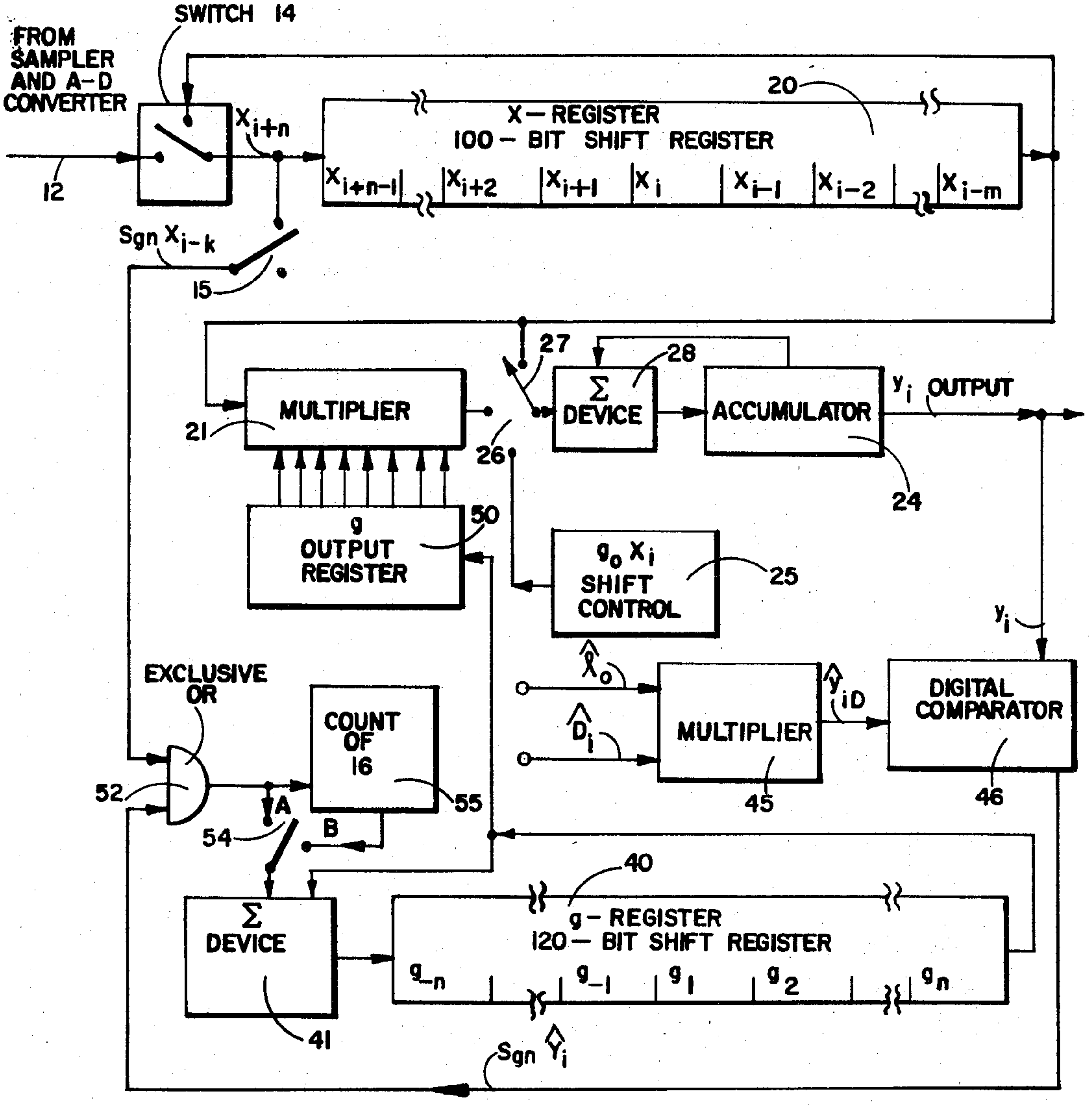
FIG. 1 illustrates in block diagram form the preferred embodiment of the invention.

Referring to FIG. 1, a received signal 12 from a sampler and analog-to-digital converter is fed to a switch 14. The received signal has been sampled once per baud and each sample is typically quantitized to a 10-bit accuracy. A recirculating shift register 20 is used to receive the digitized samples designated $x$ and to recirculate the samples serially from the output of the shift register back to the input through the switch 14. The basic operation to be performed by the system is to calculate, once each baud time, the quantity $$y_i = \sum_{k=-m}^{n} g_k x_{i-k} \qquad \text{Eq. (1)}$$

where the $x$'s are the digitized samples of the signal 12 at the equalizer input and wherein the equalizer system has $m + n + 1$ stages. In operation, at the time signal sample $x_{i+n}$ appears at the input of the $x$-register 20, the signal samples $x_{i+n-1}$ through $x_{i-m}$ are in the register; and, during the $i^{th}$ baud interval, signal sample $x_{i+n}$ feeds into the $x$-register and the signal samples $x_{i-m}$ through $x_{i+n}$ feed serially out of the $x$-register and into a multiplier 21. Also, all of the samples except $x_{i-m}$ recirculate back into the $x$-register through switch 14. Then, during the $(+ 1)^{th}$ baud interval, the newly received signal sample $x_{i+n+1}$ feeds into the $x$-register and signal samples $x_{i-n+1}$ through $x_{i+n+1}$ feed serially out of the $x$-register and into multiplier 21. In the preferred embodiment shown, the $x$-register 20 is a 100-bit MOS shift register. Since this $x$-register can hold 10 $x$'s and one additional $x$ per baud feeds in, we assume an 11-stage equalizer section. This is enough stages for some applications, but when more stages are required, additional sections can be added in tandem; and the additional sections can have lower quantization accuracy.

All of the gain factors normally associated with an equalizer except the gain factor $g_0$ are stored in a $g$-register 40 which, in the preferred embodiment, is a 120-stage shift register. Ten $g$'s recirculate through the shift register once each baud time in synchronization with the circulation of the $x$'s in the $x$-register 20. As each $g$ leaves the $g$-register, it is fed back through a summation device 41 to the input of the $g$-register and also to an output register 50, which dumps each $g$ in parallel into the multiplier 21. As each g leaves the $g$-output register 50, multiplier 21 multiplies this $g$ by the corresponding $x$, leaving the $x$-register in order to perform the multiplications called for by Equation (1) for the $i^{th}$ baud interval. Each of these $g$'s is a 12-bit number which is rounded off to an eight-bit number when it is fed into the $g$-output register 50. The reason for using 12 bits and then rounding off to eight bits is to provide an averaging effect to reduce the effects of data signal variations and noise, as will be clarified below.

The $g$-register 40 stops shifting during the time that $g_0$ is to be utilized because $g_0$ is treated separately. The gain factor $g_0$ is fixed in the preferred embodiment, $g_0 = 2^{14}$ on the scale where each increment size is unity before roundoffs of the $g$'s. However, since the least significant four-bits of each $g$ are discarded in the roundoff, only 10 bits are required to store $g_0$. Since $g_0$ is fixed and equal to $2^{14}$, we do not have to use the multiplier to multiply $g_0$ times $x_i$, but can accomplish this multiplication by properly shifting $x_i$ into an accumulator 24. This is accomplished by using the $g_0$ shift control 25 and switches 26 and 27. By using this technique plus the roundoff, we can make our largest gain factor $g_0$ equal to $2^{14}$ although the multiplier accepts only an eight-bit parallel input. Since the other $g$'s are normally less than ¼$g_0$ and the four least significant bits are discarded in roundoff, we can set $g_0$ equal to $2^{14}$ and still use only eight bits for the $g$'s entering the multiplier 21. The summation device 28 receives the $x$ value from the shift register 20 directly through switch 27 and the $g_0$ value from $g_0$ shift control 25 through switch 26 and provides a signal which then is the summation or product of the two directly to the accumulator 24. The summation device 28, which also receives as an input signal the output of accumulator 24, operates with accumulator 24 to accumulate the multiplier 21 outputs along with the $g_0 x$ value for one baud interval to obtain the signal designated $y_i$, as given by Equation (1).

A second multiplier 45 receives as inputs the signals $\hat{l}_o$ and $\hat{D}_i$ which signals are multiplied together to form a third signal $\hat{y}_{iD}$. In conventional binary or multilevel signaling, and assuming all sampling rates equal the baud rate, $\hat{l}_o$ is an estimate of $l_o$ which ordinarily is the main (or largest) sample of the overall transmission system pulse response as seen at the output of the equalizer, and $\hat{D}_i$ is the same as $\hat{d}_i$, the receiver's estimate the $i^{th}$ transmitted digit value, $d_i$. In various methods of partial responses and related schemes, $l_o$ is the first main sample of the pulse response as seen at the equalizer output (the first sample that acts as signal, not intersymbol interference) and $D_i$ is a preselected combination of the transmitted digit values $d$'s. Assuming that the quantities $\hat{l}_o$ and $\hat{D}_i$ are already available in digital form from equipment external to the equalizer, then multiplier 45 multiplies $\hat{l}_o$ and $\hat{D}_i$ to obtain the signal $$\hat{y}_{iD} = \hat{l}_o\hat{D}_i \qquad \text{Eq. 2}$$

The signal $y_{iD}$ is then fed to a digital comparator 46. The comparator 46 compares the two digital numbers $y_i$ and $y_{iD}$ and generates a single binary digit to indicate which of these two numbers is the larger. This binary output digit is Sgn $Y_i$ where $$\hat{Y}_i = y_i - \hat{y}_{iD} \qquad \text{Eq. 3}$$

The output signal from digital comparator 46 is then fed to one input of an exclusive OR-gate 52. The other input of exclusive OR-gate 52 is taken from switch 15 which periodically is connected to the input to $x$-register 20. The timing of switch 15 is so arranged that this switch extracts (passes) the sign bit, Sgn $x_{i-k}$, from each group of bits entering $x$-register 20, where each group of bits represents one digitized signal sample. The output of the exclusive OR-gate 52 is connected to a switch 54 and to a counter 55 which counts to 16. The output of counter 16 is also connected to one terminal switch 54 such that depending upon the direction of switch 54, either the output of exclusive OR gate is fed directly to the summation device 41 or is taken from the counter 55. When $g_k$ arrives at the input of summation device 41, Sgn $x_{i-k}$ and Sgn $Y_i$, for example, arrive at the input of the exclusive OR-gate 52. With switch 54 in the A position, the exclusive OR gate obtains the product Sgn $Y_i$(Sgn $x_{i-k}$) causing summation device 41 to increment $g_k$ in the positive or negative direction, depending upon whether Sgn $Y$ Sgn $x_{i-k}$ is a mark or a space. On a scale where $g_0$ equals $2^{14}$, each $g_k$ is incremented by $\Delta_o = \pm 1$ once each baud time. This changing of each $g_k$ by only a very small increment during each baud interval results in averaging out most of the effects of pseudo-random data components and noise in the adjustment of each $g_k$. Because $g_0$ equals $2^{14}$, each $g_k$ can deviate by 16 increments from the optimum value before it is in error by 0.1 percent of $g_0$. This small increment size is for accurate adjustment of the $g$'s after initial learning. During initial learning, switch 54 is placed in the B position. Then each output from the exclusive OR-gate 52 causes a count of ±16 to be added to the $g_k$ entering the summation device 41. After initial learning, switch 54 goes back to the A position where each output from the exclusive OR gate causes a count of ± 1 to be added to each $g_k$ entering the summation device 41.

The system of FIG. 1 automatically adjusts the equalizer which, unlike previous automatic equalizer adjustment schemes, adjusts the equalizer to gain settings that combat both the intersymbol interference and the noise, which results in far better overall receiver performance than previously known systems.

Figure 2:
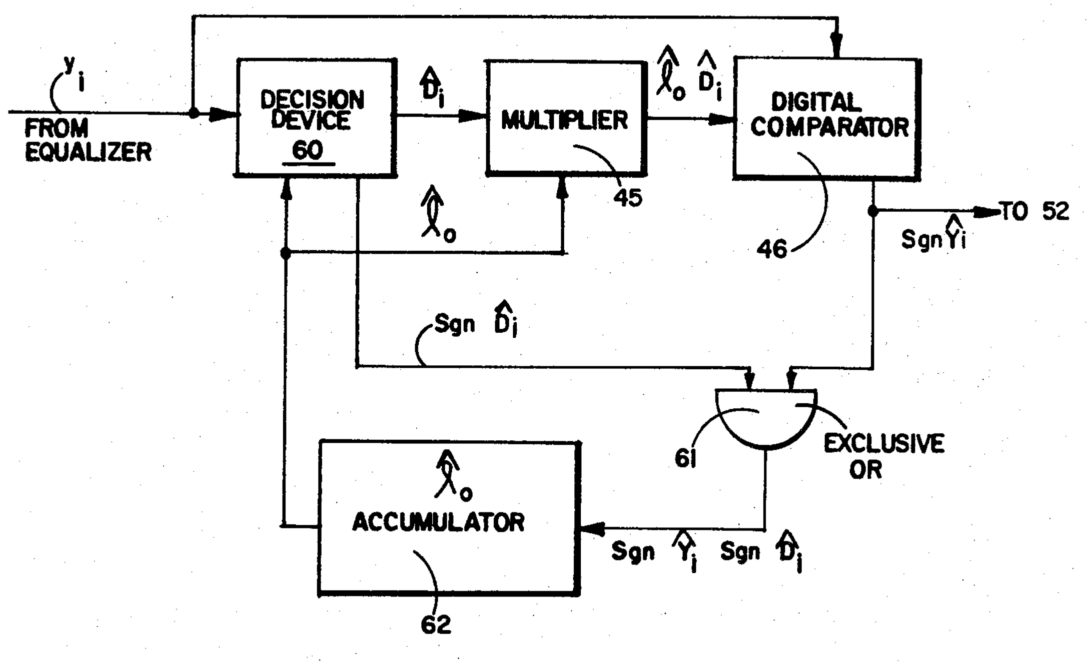
FIG. 2 illustrates in block diagram form an estimate $\hat{l}_o$ device which may be used with the preferred embodiment.

In some applications, the quantity $\hat{l}_o$ entering multiplier 45 can be a fixed, precalculated and preset value. Most receivers have an automatic gain control, AGC, ahead of the equalizer. If this AGC keeps the rms signal level sufficiently constant so that a preset fixed $\hat{l}_o$ is sufficiently accurate, $\hat{l}_o$ can be fixed. For applications in which $\hat{l}_o$ is not known with sufficient accuracy in advance, the arrangement shown in FIG. 2 can be used with conventional, linear binary or multilevel signaling.

The signal samples from the equalizer output enter the decision device 60. The decision device 60 compares each signal sample, $y_i$, with preset threshold levels to evaluate the corresponding received digit, $D_i$. For example, suppose the possible values of each transmitted digit $D_i$ are ± 1 and ± 3. Ideally, $y_i = l_o D_i$ and the decision device is to evaluate $D_i$ from $y_i$. The decision device compares $y_i$ against three threshold settings, 0, $-2\hat{l}_o$ and $+2\hat{l}_o$ and evaluates $D_i$ according to the amplitude of $y_i$ relative to the thresholds. Since $l_o$ itself is unknown to the receiver, the estimated value $\hat{l}_o$ is used instead of $l_o$. The following table shows the selected value of $\hat{D}_i$ (the digit decision) as a function of the amplitude of $y_i$.

| Amplitude of $y_i$ | Digit Decision, $\hat{D}_i$ |
|---|---|
| $y_i < -2\hat{l}_o$ | −3 |
| $-2\hat{l}_o \leq y_i < 0$ | −1 |
| $0 \leq y_i \leq 2\hat{l}_o$ | +1 |
| $y_i > 2\hat{l}_o$ | +3 |

The digit decision from the decision device 60 enters the multiplier 45 which multiplies this digit decision by $\hat{l}_o$. The resulting product $\hat{l}_o\hat{D}_i$ and the signal sample $y_i$ enter the digital comparator 46, which determines the sign bit, Sgn $\hat{Y}_i$, where $\hat{Y}_i = y_i - \hat{l}_o\hat{D}_i$. The decision device, in addition to evaluating each digit, $D_i$, also generates a sign bit signal Sgn $\hat{D}_i$. The two sign bit signals, Sgn $D_i$ and Sgn $Y_i$ enter the exclusive OR-gate 61, which causes a pulse (one count) to be added to or subtracted from the estimate $\hat{l}_o$ stored in the accumulator 62. The estimate $\hat{l}_o$ is increased by one increment when Sgn $Y_i$ Sgn $\hat{D}_i$ is negative and is otherwise decreased by one increment. Thus, the sum in the accumulator 52 is incrementally driven to an accurate estimate of $l_o$.

Figure 3:
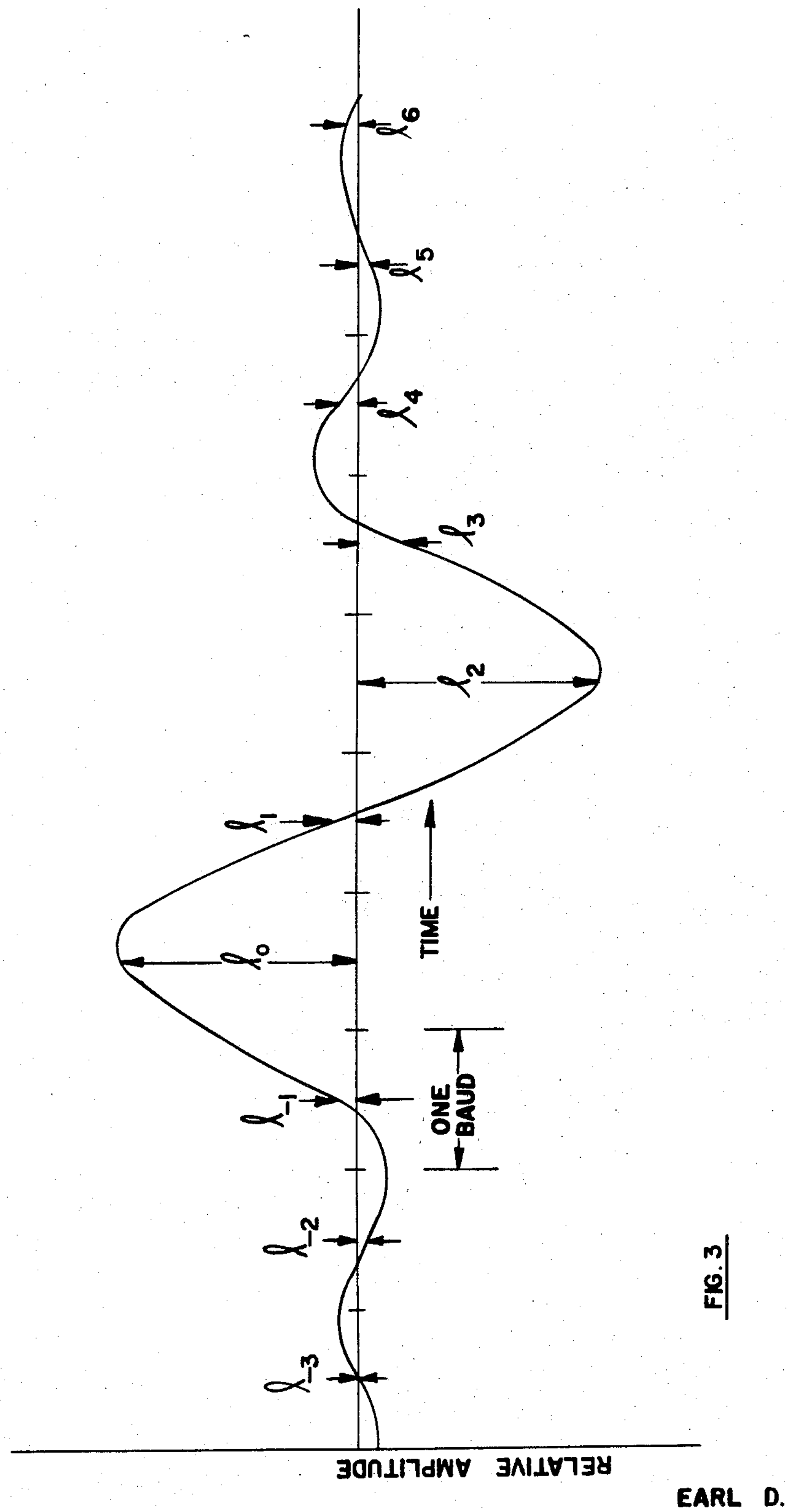
FIG. 3 illustrates in graphic form a system pulse response for one method of partial response signaling.

This automatic equalizer can be used with a wide variety of signaling schemes, such as the various "-methods of partial responses." As an example, consider a data transmission system in which the overall transmission system pulse response (or single-digit response) has the shape shown in FIG. 3. With sampling at the centers of the baud (or digit) intervals, the sequence of samples of this pulse response ideally has the following relative amplitudes: . . . 0, 0, 0, 1, 0, −1, 0, 0, 0. With imperfect equalization, this sequence of sample amplitudes is . . . $l_{-3}, l_{-2}, l_{-1}, l_o, l_1, l_2, l_3, l_4$, . . . .

The amplitude of the $i^{th}$ transmitted pulse represents the $i^{th}$ transmitted digit. Because of the way the received pulses overlap in time, if the $i^{th}$ transmitted digit is $d_i$, and $i^{th}$ received signal sample amplitude is ideally $$y_i = l_O D_i \qquad \text{Eq. 4}$$

where $$D_i = d_i - d_{i-2} \qquad \text{Eq. 5}$$

Consider, for example, four-level signaling with this method of partial responses, in which the possible values of each transmitted digit $d_i$ are −3, −1, +1, and +3. Then, each $D_i$ has the following seven possible values: 0, ±2, ±4, and ±6.

The decision device 60 makes an evaluation $\hat{D}_i$ of the seven-level quantity $D_i$ from the $i^{th}$ equalizer output signal sample $y_i$. The only difference in implementation of the decision device is that now we use six decision threshold level settings in order to distinguish between the seven possible values of $D_i$, whereas in the previous example of conventional signaling we use three decision threshold settings ($-2l_o$, 0 and $+2l_o$) to distinguish between the four possible values of $D_i$.

A separate disclosure describes means for automatically and precisely learning the correct decision threshold settings for various methods of partial responses. However, in some applications, fixed decision thresholds can be used by placing a conventional automatic gain control in the receiver ahead of the automatic equalizer.

The six decision threshold settings in this particular method of partial responses can be $\pm l_o$, $\pm 3l_o$ and $\pm 5l_o$. Except for an imperfection in equalization these settings are equivalent to $\pm(l_o - l_2)/2$, $\pm 3(l_o - l_2)/2$ and $\pm 5(l_o - l_2)/2$, respectively. With the quantities $\hat{l}_o$ and $\hat{D}_i$ properly defined and determined by equipment external to FIG. 1, the entire arrangement shown in FIG. 1 applies to the various methods of partial responses, regardless of the number of signaling levels used with any particular method.

The following is a brief explanation of how this automatic equalizer achieves our two main objectives: (1) near optimum combatting of the combined effects of the intersymbol interference and noise; and (2) convergence of the automatic adjustment process under a wide range of conditions while using only the received pseudo-random data signal. From extensive analyses it has been found that these objectives can be achieved by driving each equalizer gain factor, $g_k$, to the value that minimizes the sampled crosscorrelation function:

$$C_k = \sum_{j=-\infty}^{\infty} l_j h_{j-k} \qquad \text{Eq. (6)}$$

where $h_{j-k}$ is the $(j-k)^{th}$ sample of the system pulse response as seen as the equalizer input and $l_j$ is the $j^{th}$ sample of the system pulse response as seen at the equalizer output. Note that a different crosscorrelation function is needed for each tap gain, each $g_k$.

Unlike most previous automatic equalizers, this equalizer does not merely use each gain adjustment to drive a corresponding sample of the system pulse response toward zero. Under strong intersymbol intereferece, the simple, well-known drive-to-zero technique does not accomplish our two objectives stated above. Now, the $i^{th}$ sample of the equalizer input signal is $$x_i = \sum_{\text{all } p} h_p d_{i-p} \qquad \text{Eq. (7)}$$

and the $i^{th}$ equalizer output signal sample is $$y_i = \sum_{\text{all } j} l_j d_{i-j} \qquad \text{Eq. (8)}$$

If we were to average the product $y_i x_{i-k}$ over many signal samples we would obtain $KC_k$, where $C_k$ is the cross correlation function expressed by Equation (6) and K is a constant. This fact can be seen by actually multiplying $y_i$ times $x_{i-k}$ and noting that terms of the form $d_i d_j$ average to zero when $i \neq j$ and average to a constant when $i = j$.

However, we achieve the equivalent of this multiplying and averaging process by simple implementation by noting the following. The error in $y_i$, exclusive of noise, is $$Y_i = \sum_{\text{all } j} e_j d_{i-j} \quad \text{Eq. (9)}$$

where $e_j$ is the error in $l_j$. At any given sampling time, the product Sgn $Y_t$ Sgn $x_{t-k}$ is an indication of whether the cross correlation function $C_k$ is positive or negative. Therefore, this sample binary product can be used to increment the gain factor $g_k$ in the direction that drives $C_k$ toward zero. Some of the increments will be in the wrong direction; but, because of the statistical averages involved, most of the increments will be correct. By keeping the increments very small, each gain adjustment is accurately driven to the desired value. After initial convergence, each adjustment fluctuates randomly about the correct value; but, this fluctuation is generally confined to a range of 10 or 20 increments and the increments can be made very tiny. In the recirculating implementation shown in FIG. 1, all of the crosscorrelations required for a multistage equalizer are, in effect, performed iteratively by the same simple hardware, which consists of the exclusive OR-gate 52 and the summation device 41.

While there has been shown what is considered to be the preferred embodiment of the present invention, it will be manifest that many changes and modifications may be made therein without departing from the essential spirit of the invention. It is intended, therefore, in the annexed claims, to cover all such changes and modifications as fall within the true scope of the invention.

I claim:

1. An automatic equalizer comprising
 - a first recirculating shift register for receiving a sampled digital data transmission signal;
 - a first multiplier means for serially receiving the output of said first shift register;
 - an accumulator for receiving the product signal from said first multiplier and the output signal fed back from said accumulator;
 - means for providing a signal proportional to the major sample of the impulse response of the overall transmission system;
 - means for providing a signal proportional to the estimated value of a received digit;
 - means for forming the product of said provided two signals and for providing an output signal proportional to said product;
 - comparator means for receiving the said provided product signal and the output signal of said accumulator to form a sign difference signal;
 - a second recirculating register for storing digits corresponding to gain settings;
 - incrementing means receiving the sign difference signal from said comparator means and the sign signal indicative of the sign of the signal entering said first recirculating shift register for providing an incrementing signal to said second recirculating shift register so as to increment the digits corresponding to gain settings in a direction proportional to the sign of the product of said sign difference signal and the sign of the signal from said first recirculating shift register; and
 - an output register for serially receiving the output signal of said second recirculating register and for providing said serially received signal in parallel output to said first multiplier means for multiplication with the output from said first recirculatory shift register.

2. The automatic equalizer according to claim 1 and further comprising:
 - means for providing a signal indicative of a fixed gain factor;
 - switch means interposed between the output of said first multiplier and the input to said accumulator for disconnecting the output of said first multiplier from said accumulator input and for connecting the output of said first recirculating shift register to said accumulator input at a time corresponding to the position of said fixed gain factor with respect to the serial output of said first shift register.

3. The invention according to claim 2 wherein said incrementing means is comprised of:
 - an exclusive OR gate for receiving at its inputs the sign difference signal and the sign signal indicative of the sign of the signal entering said first recirculating shift register;
 - a summation device for receiving as one input the output from said second recirculating register and as another input the input from said exclusive OR gate.

4. The invention according to claim 3 and further comprising:
 - counter means connected to the output of said exclusive OR gate;
 - switch means interposed between the output of said exclusive OR gate and one input of said summation means for connecting the output of said exclusive OR gate to the input of said summation means or connecting the output of said counter means to the input of said summation means.

5. The invention according to claim 3 and further comprising:
 - a switch means interposed between the input to said first recirculating shift register and one input of said exclusive OR gate for connecting said one exclusive OR gate input to said shift register input upon the arrival of a recirculated sample at the input of said first recirculating shift register.

6. An automatic equalizer comprising
 - a first recirculating shift register for receiving a sampled digital data transmission signal;
 - a first multiplier means for serially receiving the output of said first shift register;
 - an accumulator for receiving the product signal from said first multiplier and the output signal fed back from said accumulator;
 - a decision means for receiving as an input the output of said accumulator means, said decision means determining the approximate digital level of the signal from said accumulator means as compared against an estimated value of a major sample of the system's input response and, in addition, providing a sign signal of said approximate digital level;
 - a second multiplier means for multiplying the estimated signal level from said decision means with the estimated value of the major sample of the system's impulse response;
 - a digital comparator for comparing the multiplied signal from said second multiplier means with the output signal from said accumulator to form a sign difference signal;

an exclusive OR gate receiving as inputs the sign signal from said decision means and the sign difference signal from said digital comparator;

an accumulator connected to receive the output from said exclusive OR GATE FOR ACCUMULATING THE OUTPUT FROM SAID EXCLUSIVE OR gate to provide said estimated value of the major sample of the system's impulse response.

a second recirculating register for storing digits corresponding to gain settings;

incrementing means receiving the sign difference signal from said comparator means and the sign signal indicative of the sign of the signal entering said first recirculating shift register for providing an incrementing signal to said second recirculating shift register so as to increment the digits corresponding to gain settings in a direction corresponding to the sign of the product of said sign difference signal and the sign of the signal from said first recirculating shift register; an an output register for serially receiving the output signal of said second recirculating register and for providing said serially received signal in parallel output to said first multiplier means for multiplication with the output from said first recirculatory shift register.

7. The automatic equalizer according to claim 6 and further comprising:

means for providing a signal indicative of a fixed gain factor;

switch means interposed between the output of said first multiplier and the input to said accumulator for disconnecting the output of said multiplier from said accumulator input and for connecting said means for providing said fixed gain factor to the accumulator input at a time corresponding to the proper position of said fixed gain factor with respect to the serial output of said first shift register.

8. The invention according to claim 6 wherein said incrementing means is comprised of:

a second exclusive OR gate for receiving at its inputs the sign difference signal and the sign signal indicative of the sign of the signal entering said first recirculating shift register;

a summation device for receiving as one input the output from said second recirculating register and as another input the output from said second exclusive OR gate.

9. The invention according to claim 8 and further comprising:

counter means connected to the output of said second exclusive OR gate; and switch means interposed between the output of said second exclusive OR gate and one input of said summation device for connecting the output of said second exclusive OR gate to the input of said second recirculating shift register or connecting the output of said counter means to the input of said second recirculating shift register.

10. The invention according to claim 8 and further comprising:

a switch means interposed between the input to said first recirculating shift register and one input of said second exclusive OR gate for connecting said one second exclusive OR gate input to said shift register input upon the arrival of a recirculated sample at the input of said first recirculating shift register.

11. An automatic adaptive equalizer comprising:

means for sampling a received signal to provide a signal $x_i$, which is a digitized sample of the received signal taken once each baud time;

a $m+n+1$ stage register means for receiving said $x_i$ signal such that during the $i^{th}$ baud interval signal sample $x_{i+n}$ feeds into the register and the signal samples $x_{i-m}$ through $x_{i+n}$ feed serially out of the x-register and all samples except $x_{i-m}$ recirculate back to the input of said register means;

multiplier means connected to receive the serial output from said register means;

a second storage means for storing and recirculating gain factors, $g$, once each baud time in synchronization with the circulation of $x$'s in the said first named register means;

a summation means receiving the recirculating gain factors and summing therewith an incremental signal $\Delta_g = \pm 1$ and for feeding the sum signal to the input of said second storage means;

a $g$-output register for serially receiving the gain factors, g, from said second storage means and for providing said gain factors in parallel to said multiplier means for multiplication with the serial output from said register means;

means for accumulating the output from said multiplier means to form the equalizer output $y_i$ where:

$$y_i = \sum_{k=-m}^{n} g_k x_{i-k}$$

means for providing an estimated signal $\hat{y}_{iD}$ of the value of the signal $y_i$ with intersymbol interference removed; $\hat{Y}_i$ comparator means providing a signal Sgn $\hat{Y}_i$ which is the sign signal of the quantity $\hat{Y}_i$ where $\hat{Y}_i$ is an estimate of the error in the equalizer output and is defined by equations $\hat{Y}_i = y_i - \hat{y}_{iD}$ and;

means for receiving the signal Sgn $\hat{Y}_i$ and a signal Sgn $x_{i-k}$ from the input of said $m+n+1$ stage register means for forming the product thereof the sign of which determines the direction in which $\Delta g$ is applied to said summation means.

* * * * *